United States Patent [19]

Eichenhofer

[11] 4,151,766

[45] May 1, 1979

[54] DISC MACHINING PROCESS AND APPARATUS

[76] Inventor: Josef Eichenhofer, 52 Abbey Rd., Brampton, Canada

[21] Appl. No.: 823,607

[22] Filed: Aug. 11, 1977

[51] Int. Cl.² ............................ B23B 3/22; B23B 3/00
[52] U.S. Cl. ........................................ 82/4 A; 82/2 A
[58] Field of Search ................. 82/4 R, 48, 1 C, 2 A, 82/21 A

[56] References Cited

U.S. PATENT DOCUMENTS

| | | | |
|---|---|---|---|
| 2,960,765 | 11/1960 | Barrett | 82/4 A |
| 3,442,164 | 5/1969 | Blazek | 82/4 A |
| 3,555,940 | 1/1971 | Cooper | 82/4 A |
| 3,823,627 | 7/1974 | Scharfen | 82/2 A |
| 3,871,066 | 3/1975 | Mitchell | 82/4 A |

*Primary Examiner*—Harrison L. Hinson
*Attorney, Agent, or Firm*—Hirons & Rogers

[57] ABSTRACT

Metal discs such as brake disc rotors have their planar surfaces finished to the correct thickness and polish, within fine tolerances, in a single operation, by rotating the disc in a plane about an axis of rotation passing through its center, applying to its opposed planar surfaces a pair of cutting or machining tools, directly opposed to one another and one on each surface, moving the pair of tools, at a predetermined separation, radially inwardly towards the axis of rotation, and then increasing their separation and returning them to their starting position, ready for operation upon another disc. Such a process finishes brake disc rotors to the required polish and tolerance in a single step, rapidly and efficiently. Limit switches and appropriate power means are provided to stop the radially inward movement of the cutters and separate them, when the desired inner position has been reached and machined.

7 Claims, 6 Drawing Figures

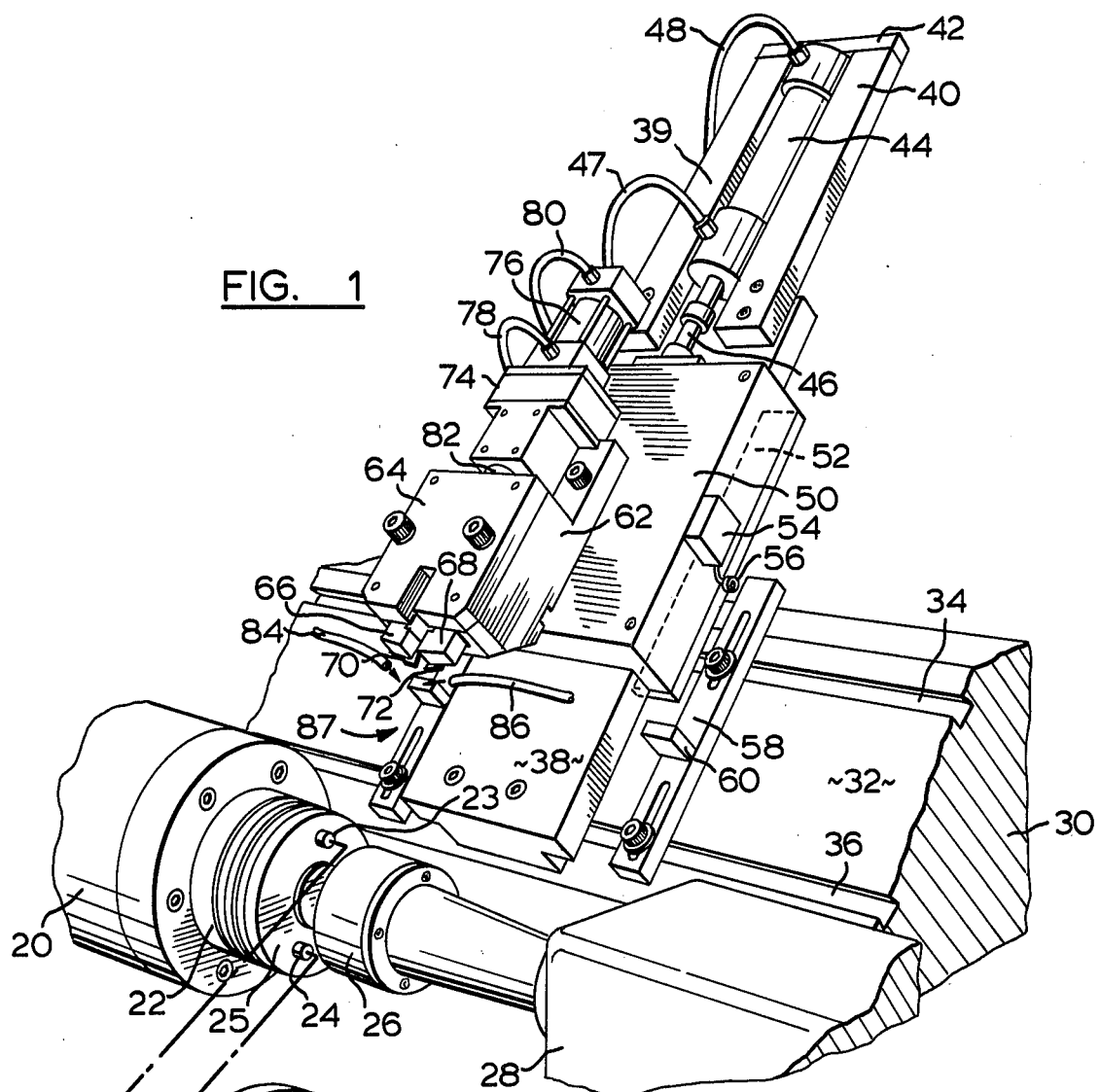
FIG. 1
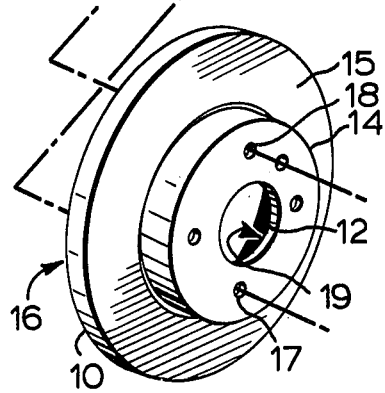
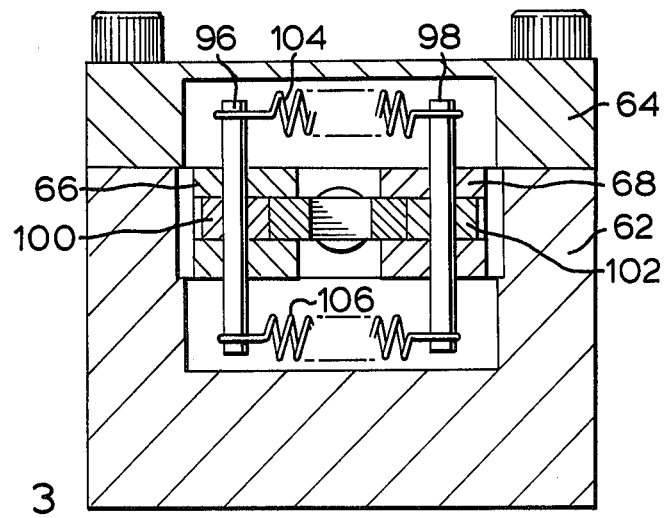
FIG. 3

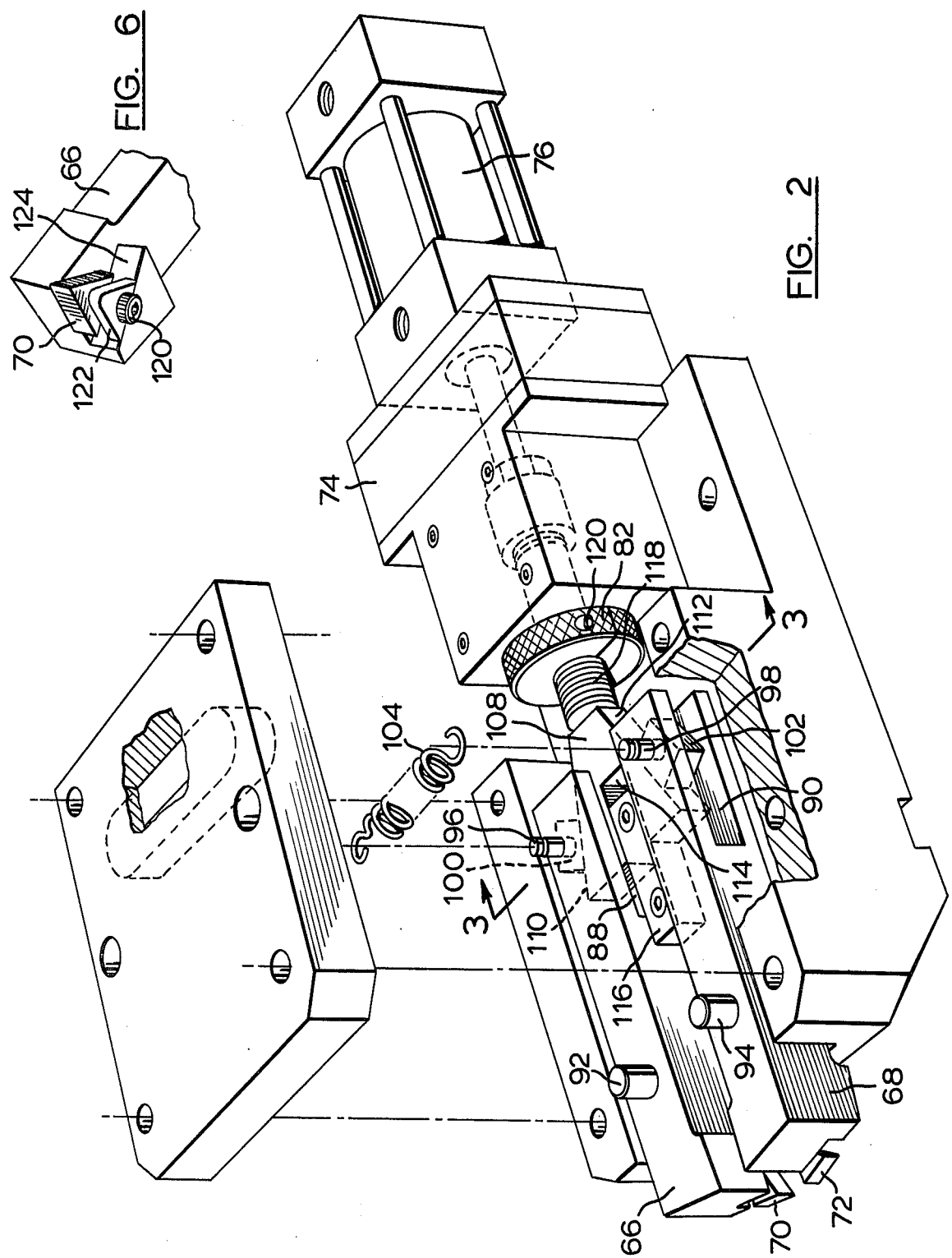

DISC MACHINING PROCESS AND APPARATUS

FIELD OF THE INVENTION

This invention relates to machining processes and apparatus, and more particularly to machining processes and apparatus for finishing the surfaces of metal discs to a fine tolerance and to a polished finish. Its specific preferred application is to the manufacture of automobile brake disc rotors.

BACKGROUND OF THE INVENTION

A brake disc rotor for use in the braking system of an automobile or other wheeled vehicle comprises a disc having a central aperture, an inner hollow circular hub by means of which the disc is mounted on a rotating vehicle axle or the like to rotate with the wheels of the vehicle, and an outer, thinner circular peripheral plate part having side braking surfaces. The braking surfaces on the outer part are gripped between stationary brake pads, operating in caliper fashion from each side of the disc rotor when the brakes are applied. In order to give satisfactory performance, the disc or disc rotor must be manufactured and finished to fine tolerances. The braking surfaces must be substantially flat and parallel to the mounting surface of the central hub, so that the disc rotor runs true. Otherwise engagement of the brake pads and braking surfaces will be uneven, causing shuddering and ineffective braking. The thickness of the outer portion of the disc rotor is important since the clearance between the rotating disc surfaces and the brake pads when the brakes are not applied is very small, of the order of 1/32". Further the braking surfaces should be smooth and polished, to allow even and gentle application of the brakes when required.

BRIEF DESCRIPTION OF THE PRIOR ART

It has previously been the custom to manufacture brake disc rotors by first casting a steel blank of the disc rotor, machining or cutting of one side to the appropriate tolerance and finish, repeating the operation on the other side of the disc rotor, and then grinding the surfaces to produce the finished article. Such a manufacturing process is costly and time consuming.

The Thielenhaus Company of West Germany recently developed a process for finishing brake disc rotors in which the blank is subjected to a grinding operation on both opposed braking surfaces simultaneously, to finish the disc rotor with a high degree of precision. This process and the machine for carrying out this process are described in the German technical literature and such machines are or were on the European market. Whilst the results obtained using such a process and machine are good, the machine itself is very large and expensive. It involves the performance of complicated operations with the movement of the disc rotor as well as the movement of various grinding wheels, in a precision, controlled manner.

BRIEF SUMMARY OF THE INVENTION

It is an object of the present invention to provide a new and improved process and apparatus for the precision finishing of discs such as brake disc rotors.

It is a further object to provide such a process and apparatus which can be operated quickly and economically, without the use of large expensive machinery, to give precision finished and surface polished brake disc rotors.

According to the present invention, it has been found that brake disc rotors can be prepared and finished to the necessary standards of tolerance and polish in a single step by cutting or machining of the braking surfaces thereof using conventional machining and cutting tools such as tungsten carbide or ceramic tipped tools. The disc blank is rotated about an axis of rotation passing through its center, and the tools are used in pairs, one on each side of the disc, opposite to each other, and are moved radially inwardly towards the center of the rotating disc, so that the two braking surfaces are machined simultaneously. The pair of cutting tools have a predetermined separation between them so as to machine the surfaces to the correct tolerance. When they reach a preset radially inner limit on the rotating disc, they automatically separate and are withdrawn radially outwardly beyond the circumference of the rotating disc, ready to perform similarly on another disc mounted in the apparatus.

The process and apparatus according to the invention machine finishes brake disc rotors simply, quickly and economically in a single operation, to a required tolerance, producing polished articles at a fraction of the cost of those previously made by grinding and polishing operations. The finish of the surfaces of the articles produced according to the invention, and the manufacturing tolerances, are equal to or even superior to those produced by traditional grinding and polishing processes. The machine according to the invention can be made for sale at a very attractive, economical price because of its relative simplicity to build, and is in addition simple and economical to operate.

Thus according to a first aspect of the present invention, there is provided a process for machining the planar side surfaces of metal discs, which comprises:

rotating the disc in a plane about a fixed axis of rotation passing through the center of the disc;

applying machining tool cutters, in axially opposed relationship to one another, to first radial extremes of the portions of the opposed planar rotating side surfaces of the metal disc to be machined, whilst rotating the disc about said fixed axis relative to the cutters, said cutters being maintained at a predetermined separation from one another to engage and machine said portions of the side surfaces;

moving the cutters radially across the portions of the opposed planar rotating side surfaces of the metal disc until the cutters reach a predetermined radial limit corresponding to the second radial extremes of said portions, said cutters being maintained substantially at said predetermined separation from one another during such radial movement;

increasing the separation between the cutters when the cutters have reached said predetermined radial limit, to bring the cutters out of contact with the rotating disc surfaces;

and subsequently moving the cutters in the reverse radial direction towards their radial starting position, whilst the cutters are disposed out of contact with the rotating disc surfaces.

According to another aspect of the present invention, there is provided an apparatus for simultaneous machining of opposed planar side surfaces of metal discs, said apparatus comprising:

rotatable mounting means for mounting thereon a disc to be machined and for rotating said disc about an axis of rotation passing through the center of the disc and in a plane parallel to the plane of the opposed planar side surfaces of the disc;

a pair of cutters presented towards each other but spaced apart in a direction parallel to the axis of rotation of the disc, said cutters being movable between a first relative position in which the cutters have a first predetermined separation therebetween in the direction parallel to said axis, and a second relative position in which the cutters have a relatively larger separation therebetween;

movable cutter mounting means holding said pair of cutters thereon, said cutter mounting means being movable relative to the axis of rotation of the disc in a radial direction, towards and away from said axis of rotation;

limit means limiting the extent of radially inner movement of said cutter mounting means towards said axis of the rotation.

DESCRIPTION OF THE PREFERRED EMBODIMENTS

A preferred apparatus according to the present invention has the movable cutter mounting means in the form of a slidable member carrying the cutters, and a fixed slide box is provided upon which the slidable member is mounted for relative sliding movement towards and away from the rotatable mounting means, in a radial direction relative to the axis of rotation. Limit switches can be provided, on the sliding member and adapted to engage actuating means on the slide block or associated therewith, coupled to the driving means for causing the sliding movement, so as to limit the radially inward movement of the slidable member carrying the cutters. Another limit switch means may be provided to operate simultaneously to cause movement of the cutters to their position of greater separation, as the radially inward movement of the cutters ceases. Alternatively, the same limit means can be used to control both functions.

BRIEF REFERENCE TO THE DRAWINGS

FIG. 1 is a perspective view of essential parts of an apparatus according to a preferred embodiment of the invention;

FIG. 2 is an exploded perspective view of a part of the apparatus of FIG. 1;

FIG. 3 is a sectional view along the line 3—3 of FIG. 2;

FIG. 6 is a perspective view of a detail of the cutting tool and holder therefor, of the apparatus of FIGS. 1-5.

In the drawings, like reference numerals indicate like parts.

DETAILED DESCRIPTION OF THE SPECIFIC PREFERRED EMBODIMENT

Figure 4:
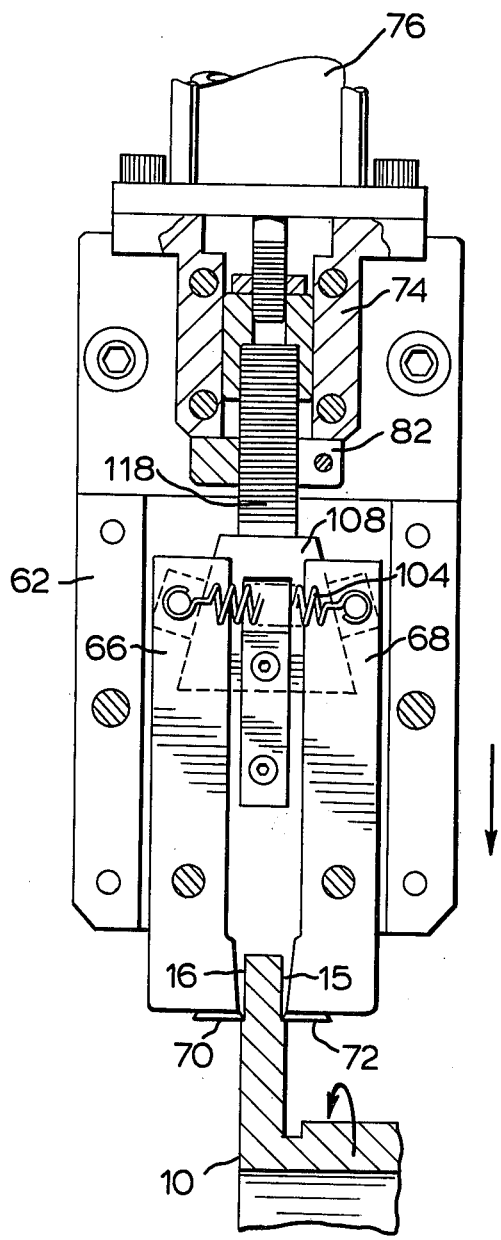
FIG. 4 is a front view, partly in section and with parts removed for clarity, of the apparatus of FIGS. 1-3, in a first operative position during a cycle of operation.

With reference to FIG. 1, a disc brake rotor 10 is shown, having a central aperture 12, an axially projecting hollow central mounting hub 14 and an outer circular disc portion with side surfaces 15, 16 which in the finished article constitute braking surfaces. The hub 14 is provided with mounting apertures such as 17, 18 extending therethrough. The inner side surface 19 of the hub 14 of the disc brake rotor 10 will, when in use, be mounted against a rotating axle or hub surface of the vehicle, so that the rotor 10 rotates about an axis of rotation passing through its center and substantially in a plane extending perpendicular to the axis of rotation. It is consequently necessary that, in the finished rotor 10, the braking surfaces 15, 16 be parallel to the inner side mounting surface 19 of the hub 14, so that the braking surfaces 15, 16 and mounting surface 19 all rotate in a plane. Such an arrangement allows for proper, even engagement of brake pads with the braking surfaces 15, 16 in operation. The apparatus and process of the present invention, as illustrated, is adapted to provide the necessary precision machining to finish the braking surfaces 15, 16 to the required parallelism to the mounting surface 19, and polished finish, without the necessity of a grinding operation, whilst at the same time reducing the outer disc portion to the required thickness. The rough disc 10 is supplied to the machine and process of the invention in condition with its mounting surface 19 formed to the necessary flat, parallel mounting disposition.

The apparatus comprises a power driven rotating shaft 20, provided on its end with a fixed circular chuck 22 with mounting projections 23, 24 extending axially from the end surface 25 thereof. The hollow in the central hub 14 of the rotor disc 10 fits over chuck 22 of the shaft 20 so that mounting projections 23, 24 project into mounting apertures 18, 17 on the rotor disc. The shaft 20 is movable axially backwards and forwards, to clamp a rotor disc 10 mounted thereon against a freely rotatable, axially fixed backstop 26, journalled in a fixed bearing block 28. Thus rotor disc 10 rotates along with shaft 20 and backstop 26 when mounted in position. The end surface 25 of the chuck 22, against which the mounting surface 19 of the hub 14 of the rotor disc 10 is pressed and mounted flush, is accurately adjusted and arranged to lie in a plane, perpendicular to the axis of rotation of the shaft 20, which axis passes through the center of the disc rotor 10 when the rotor is mounted in position.

To the side of the rotating shaft 20, and extending generally parallel to the axis of rotation thereof, is provided a fixed mounting block 30, generally triangular in cross-section, and having a sloping front surface 32 extending downwardly towards the rotating shaft 20. Mounting grooves 34, 36 extend across the front surface 12, parallel to each other. A fixed slide base block 38 is fixedly mounted on the front surface 32 at a position opposite the gap between the rotating chuck 22 and the backstop 26, where the rotor disc 10 is mounted. The base block 38 is T-shaped in cross-section, the head of the T being disposed upwardly. The base block 38 extends generally parallel to sloping front surface 32, upwardly from a position in the vicinity of the rotating shaft 20 to a position considerably beyond the top surface of the mounting block 30. At its upper end, the T-shaped block 38 is provided with a pair of fixed, upwardly extending spaced struts 39, 40 with a cross bar 42 joining them at their uppermost extremities. A hydraulic cylinder 44 is mounted in the framework formed by the struts 39, 40, cross bar 42 and top edge of T-shaped block 38, with a piston rod 46 extending downwardly therefrom, and hydraulic fluid connection hoses 47, 48 extending therefrom to a standard reservoir, pump and control system, not shown.

A sliding plate 50 is provided, slidable upwardly and downwardly on the upper surface of T-shaped block 38, the plate 50 having side flanges and lower inturned edges 52 thereon to engage slidably under the flanges of the T-shaped block 38. The top edge of the plate 50 is connected to the piston rod 46 of the hydraulic cylinder 44, so that plate 50 is slidable up and down on T-shaped block 38 in response to movement of piston rod 46 and hence to hydraulic pressure in cylinder 44. A limit switch 54 with downwardly extending switch actuator 56 is provided on the side of the sliding plate 50. A rod 58 is adjustably mounted on the front surface 32 of mounting block 30, for up and down adjustment thereon, at one side of the T-shaped block 38. The rod 58 has an upstanding projection 60 thereon, positioned to engage the actuator 56 of the limit switch 54 on downward sliding movement of the sliding plate 50. The limit switch 54 is connected by standard means not shown to control the supply of hydraulic fluid to the hydraulic cylinder 44 and hence limit and reverse the sliding movement of the plate 50.

Fixedly mounted on the front top surface of the plate 50, and hence sliding therewith, is a cutting tool holder and actuator assembly comprising a head box 62 with a removable cover plate 64. A pair of tool holders 66, 68 with removable and replacable cutter tips 70, 72 of tungsten carbide are mounted in the head box 62 for limited pivotal movement thereon, and project downwardly out of the bottom end of box 62. The cutters 70, 72 are presented towards each other, and spaced apart a short distance in the direction of the axis of rotation of shaft 20. They are located directly above the space between chuck 22 and backstop 26 so as to engage the braking surfaces 15, 16 of a disc 10 mounted on chuck 22 and rotating therewith. At its upper end, head box 62 has a cutaway portion in which is mounted a sleeve 74 fixed to the base of the head box 62. The top end of sleeve 74 carries a pneumatic cylinder 76 with pneumatic pressure hoses 78, 80 connected thereto from a controlled source of pneumatic pressure. A piston rod carrying an adjustment wheel 82 passes slidably downwardly from pneumatic cylinder 76 through sleeve 74 into the body of head box 62, to operate the opening and closing movement of the tool holders 66, 68 as described below. Cooling fluid supply lines 84, 86 are provided, terminating in the vicinity of the cutters 70, 72.

At the side of T-shaped block 38 remote from rod 58, and hence not shown in detail in FIG. 1, there is provided a control means generally designated 87 and comprising a limit switch and actuator, on the side of T-shaped block 38, and an adjustable rod with projection to engage the switch acutator, mounted on the front surface 32 of block 30, essentially similar in all respects to limit switch 54, actuator 56, rod 58 and projection 60 but connected to the pneumatic pressure control to pneumatic cylinder 76. The control means 87 is set so as to operated simultaneously with the operation of limit switch 54.

Before proceeding with the detailed description of the mechanisms in head box 62, it will be convenient to describe the general operation of the machine illustrated in FIG. 1. The prior rotor 10 is mounted on chuck 22 and shaft 20 set rotating at substantially constant speed. Initially, sliding plate 50 is at an upper position so that cutters 70, 72 are clear of the circumference of the spinning rotor 10. The cutters are at a relatively separated, first position.

When the machine is switched on, pneumatic cylinder 76 operates to close cutters 70, 72 to their second, preset, relatively closed position accurately preset to give a finished rotor 10 cut to the correct thickness by cutters 70, 72. Hydraulic cylinder 44 is pressurized to cause downward sliding movement of plate 50 and associated head box 62 and cutters 70, 72 into engagement with braking surfaces 15, 16 of the rotor 10. This downward movement of the cutters continues, with the surfaces 15, 16 being simultaneously cut and polished by cutters 70, 72, until the cutters reach the radially inner extremities of the surfaces to be cut and polished. This position is predetermined, by correct positioning of rod 58 on block 30 so that the projection 60 on the rod 58 engages the actuator 56 of limit switch 54. As the cutting is proceeding, the surfaces and cutters are being supplied with cooling fluid from lines 84, 86. Simultaneously with the action of switch 54 in this manner, the limit switch of the control means on the other side of T-shaped block 38 is actuated to cause the pneumatic cylinder 74 to allow return of the cutters 70, 72 to their first, relatively separated position. Actuation of switch 54 causes the hydraulic cylinder 44 to reverse its action and bring the slide plate 50, along with the header box 62 and cutters 70, 72, upwardly back to their initial position. The shaft 20 can then be stopped and the finished rotor disc 10 removed and replaced, and the cycle repeated.

The means by which the opening and closing of the cutters 70, 72 is achieved is illustrated in more detail in FIGS. 2-6.

With respect to FIG. 2, it can be seen that the tool holders 66, 68 are elongated members with respective bifurcations 88, 90 at the top ends thereof, and are disposed side-by-side in the head box 62. The cutters 70, 72 are generally flat triangular members, of tungsten carbide, releasably secured to the bottom ends of the respective tool holders 66, 68. Respective rounded corners of the cutters 70, 72 are presented inwardly towards each other, and into the longitudinal gap between the tool holders 66, 68. The tool holders are pivotally mounted near their lower ends by respective pivot pins 92, 94, extending through the tool holders and into the base of the head box 62.

The bifurcations 88, 90 in the top ends of the tool holders 66, 68 are provided with respective upper grooved pins 96, 98 which extend laterally through the bifurcated slots in the tool holders 66, 68, and project beyond the forward and rearward surfaces thereof, as shown in FIG. 3. Bearing blocks 100, 102 are provided on the respective pins 96, 98 within the bifurcations 88, 90, of the tool holders. A coil spring 104 extends between the top part of pin 96 and the top part of pin 98, urging the pins 96, 98 and hence the tops of the tool holders 66, 68 towards one another and hence urging the cutters 70, 72 and lower parts of the tool holders below pivot pins 92, 94 away from one another. A similar coil spring 106 extends from pin 96 to pin 98 below the tool holders, as seen in FIG. 3. The cover plate 64 of the head box 62 is recessed on its inner surface to accommodate spring 104 and the extremities of pins 96, 98.

There is provided a cam plate 108, having straight, inclined similar side cam surfaces 110, 112 against which the bearing blocks 100, 102 engage and towards which they are urged by springs 104, 106, the plate 108 thus acting as a constraint against this spring urging. The larger, lower ends of the cam plate 108 extend laterally into the bifurcations 88, 90 in the tool holders 66, 68. The lower end of the cam plate 108 has a longitudinal slot 114 therein, and the bottom surface of the head box 62 is provided with a fixed, upstanding guide block 116 which is located in the slot 114 and acts as a guide for the sliding movement of cam plate 108 within the head box 62.

At its upper, small end, the cam plate 108 is attached to the end of the piston rod 118 protruding slidably out of the end of the sleeve 74 from the pneumatic cylinder 76. At its lower end, near its attachment to the top of the cam plate 108, the rod 118 is externally screw threaded, and carries thereon a large adjustment wheel 82, which has a lock nut 120. The sides of the wheel 82 will engage against the lower surface of the sleeves 74 or the upper surfaces of the head box 62, so as to limit the sliding movement of the rod 118 and hence the cam plate 108. It will thus be appreciated that the separation of the cutters 70, 72 is dependent upon the position of the cam plate 108, pushing apart or allowing to be drawn together the pins 96, 98 under the urging of springs 104, 106. By suitable adjustment of the adjustment wheel 82 on the screw threaded rod 118, the precise separation of the cutters 70, 72 can be adjusted to the desired value, for their cutting action on a disc 10, and the set separation can be retained by the tightening of lock nut 120 to retain the wheel 82 in this set position.

Figure 5:
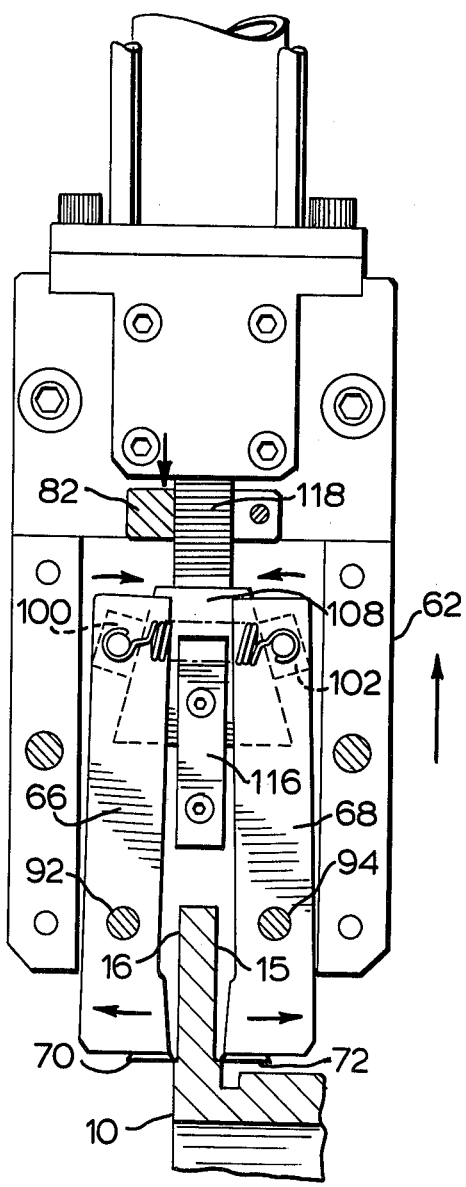
FIG. 5 is a view similar to FIG. 4, showing the parts in a different position during a cycle of operation.

Operation of the device, and particularly the operation and relative disposition during a cycle of operation of the various parts of the head box 62, is further illustrated in FIGS. 4 and 5. In FIG. 4, a disc rotor 10 is mounted on the machine, and is being rotated about an axis passing through its center, the side braking surfaces 15, 16 thereof being machined by the cutters 70, 72 to the required thickness and finish. In this position of operation, the cutters 70, 72 are located at a first, small separation from one another to effect the necessary cutting operation on the disc 10. In this position, the cam plate 108 is located at an upper position, the adjustment wheel 82 engaging against the lower end of the sleeve 74 as a stop means defining the upper position of the cam plate 108 and hence the precise separation of the cutters 70, 72. The top ends of the tool holders 66, 68 are urged against the cam surfaces 110, 112 by means of the springs 104, 106. Whilst the parts are held in this position, the hydraulic cylinder 44 is activated, so that the cutters 70, 72, tool holders 66, 68, head box 62 etc. are all moving downwardly towards the axis of rotation of the disc 10, the machining of the braking surfaces 15, 16 thereof thus being continued towards the center of the rotating disc 10.

When the parts have moved downwardly towards the center of the disc 10 to the desired, preset extent, limit switch 54 is tripped by engagement of actuator 56 with projection 60 as shown in FIG. 1. This causes downward movement to cease, by release of pressure in the hydrualic cylinder 44. Simultaneously, the limit switch of control means 87 is tripped to actuate the pneumatic cylinder 76 to push the piston rod 118 extending therefrom in a downward direction as a relatively sudden movement. As a result, cam plate 108 moves downwardly relative to bearing blocks 100, 102 as shown in FIG. 5, allowing the springs 104, 106 to bring the pins 96, 98 closer together, pivoting the tool holders about their pivot pins 92, 94, and moving the cutters 70, 72 to a greater relative separation, so as to stop their cutting or machining action on the surfaces 15, 16 of the rotating disc 10. The extent of relative downward movement of the cam plate 108 relative to the head box 62 is limited by engagement of the adjustment wheel 82 with the ends of the surface of the head box 62, as shown in FIG. 5. The action of the hydraulic cylinder 44, when the limit of downward travel of the parts is reached and the cutters resume the open position shown in FIG. 5, is reversed, so as to return the apparatus to the initial, upper position in which the cutters 70, 72 are clear of the circumference of the disc 10. The apparatus is then ready to commence another cycle of operation as described, when an operator presses the start button, to machine and finish another disc 10 mounted upon the rotating chuck 22.

The cutter mounting arrangement is shown in detail in FIG. 6, from which it can be seen that the lower portion of a tool holder 66 is provided with a triangularly cut-away portion on its lower surface, into which the generally triangular cutter 70 is mounted. A releasable screw 120 is tightened to clamp the cutter against a hard triangular packing holder 122, mounted on the end of the cutter 66. In this manner, one straight edge of the cutter 70 is mounted against the inclined surface 124 of the cut-away portion of the bottom of the tool holder 66, and one flat surface is engaged against the triangular spacing pad 122, for firm but releasable retention of the cutter 70 thereon.

By means of the process and apparatus of the present invention, discs such as brake disc rotors are cut or machined to their finished thickness within very fine tolerances, and simultaneously polished to the required degree, so that they are ready for mounting in place on a vehicle without further finishing operations. The apparatus is provided with the necessary fine adjustment means to allow it to operate to the necessry high degree of precision. At the same time, the machine is relatively simple to construct and operate.

It will be appreciated that many modifications and variations may be made to the precise form and apparatus described and illustrated herein, without departing from the scope of this invention. For example, it may be found desirable to vary the speed of rotation of the disc being machined, to increase its speed as the cutters approach the center of the rotating disc and thereby maintain a constant relative surface speed between the cutters and that part of the disc surface being machined. A more even finish of the machined surfaces is thereby obtained. Variable speed operation of rotary machines, with speed variation coupled to radial movement of a tool, is a known technique in various applications, and can readily be devised by those skilled in the art. Also, ceramic cutters, as known in the art, can be used if desired in place of the tungsten carbide cutters with consequent increase in rotational speed and use of vibration free bearing systems.

The use of hydraulic and pneumatic power means for causing movement of the various parts of the apparatus is, of course, exemplary only, and other suitable motive means, mechanical or otherwise could be substituted for either or both if desired.

I claim:

1. An apparatus for simultaneous machining and polishing of opposed planar side surfaces of metal discs, said apparatus comprising:
   rotatable mounting means for mounting thereon a disc to be machined and for rotating said disc about an axis of rotation passing through the center of the disc and in a plane parallel to the plane of the opposed planar side surfaces of the disc;
   a pair of cutters presented towards each other but spaced apart in a direction parallel to the axis of rotation of the disc, said cutters being movable between a first relative position in which the cutters have a first predetermined separation therebetween in the direction parallel to said axis, and a second relative position in which the cutters have a relatively larger separation therebetween, said cutters comprising cutter tips mounted on cutting tool holders adjacent one end thereof, the cutting tool holders being pivotally mounted at an intermediate position along their lengths;

movable cutter means to which said cutting tool holders are pivotally mounted, said cutter mounting means being movable relative to the axis of rotation of the disc in a radial direction;

biasing means urging the cutters to move towards their second relative position;

a movable constraint means movable between a first position preventing movement of said cutters under the action of the biasing means, and a second position permitting said movement;

limit means limiting the extent of radially inner movement of said cutter mounting means towards said axis of rotation;

said constraint comprising a block disposed between the cutting tool holders radially outwardly of the pivotal mounts of the tool holders, said block having side surfaces which diverge from one another in the radially inward direction towards said axis of rotation, and which bear against formations on the respective tool holders.

2. Apparatus according to claim 1 wherein said movable cutter mounting means comprises a slidable member carrying said cutters and mounted on a fixed slide block, the slidable member being mounted on the slide block for relative sliding movement towards and away from the rotatable mounting means, in a radial direction relative to the axis of rotation.

3. Apparatus according to claim 2 wherein said limit means includes a limit switch on said slidable member and an actuation means for engaging and actuating said limit switch, fixedly mounted with respect to the slide block, said limit switch being connected to control a driving means for sliding movement of the slidable member.

4. Apparatus according to claim 3 including an operating means which operates to move the constraint between its first and second positions, and a control means for said operating means, the control means comprising a limit switch on said slidable member and an actuation means for engaging and actuating said limit switch, fixedly mounted with respect to the slide block.

5. Apparatus according to claim 4 wherein the limit switch controlling the driving means for sliding movement of the slidable member, and the limit switch for the operating means for moving the constraint, are positioned to be actuated substantially simultaneously upon the slidable member carrying the cutters reaching its radially inner limit.

6. Apparatus according to claim 1 including adjustment means bearing on the constraint and operable to adjust the first position of the constraint in a radial direction and hence adjust the predetermined separation of the cutters.

7. Apparatus according to claim 6 wherein the biasing means urging the cutters to move towards their second position comprise coil springs extending between the tool holders and urging the radially outer ends of the tool holders towards each other.

* * * * *